(No Model.)
C. GOUSSET.
CHOCOLATE DIPPER
No. 526,968.　　　　　　　　Patented Oct. 2, 1894.
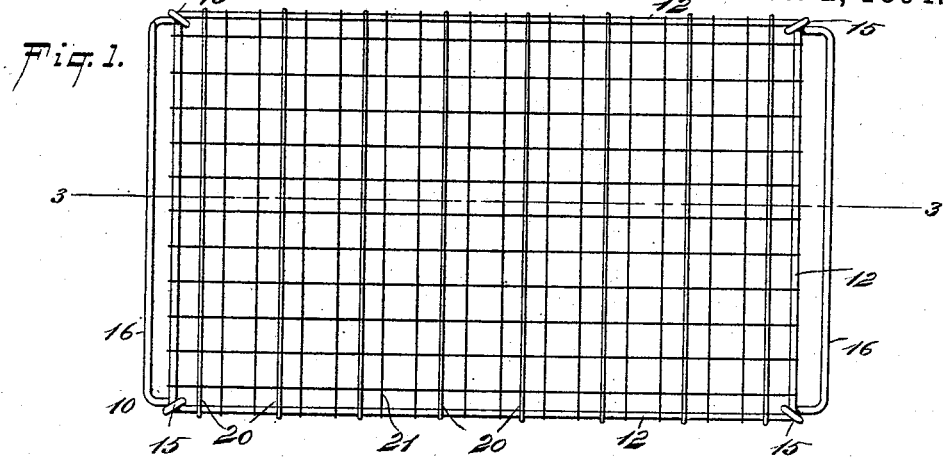
Fig. 1.
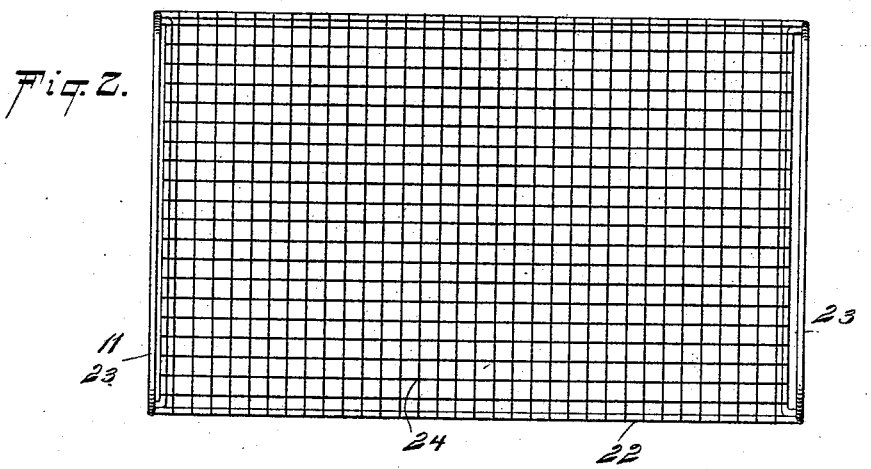
Fig. 2.
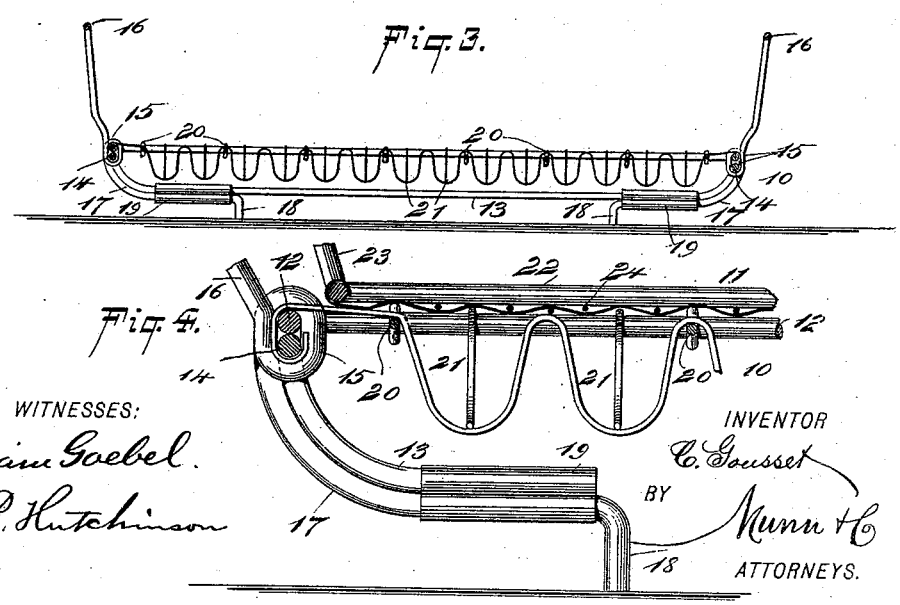
Fig. 3.
Fig. 4.
WITNESSES:
William Goebel.
N. B. Hutchinson
INVENTOR
C. Gousset
BY
Munn & Co
ATTORNEYS.

UNITED STATES PATENT OFFICE.

CYPRIEN GOUSSET, OF NEW YORK, N. Y.

CHOCOLATE-DIPPER.

SPECIFICATION forming part of Letters Patent No. 526,968, dated October 2, 1894.

Application filed March 17, 1894. Serial No. 503,973. (No model.)

*To all whom it may concern:*

Be it known that I, CYPRIEN GOUSSET, of New York city, in the county and State of New York, have invented a new and Improved Chocolate-Dipper, of which the following is a full, clear, and exact description.

My invention relates to improvements in that class of devices which are used for dipping cream drops into a chocolate solution, so as to give them the desired exterior chocolate coating.

The object of my invention is to produce a very cheap and simple device of this kind, which is adapted to carry a large quantity of cream drops, which holds them in such a way that they cannot accidentally be displaced and that they are perfectly coated, and which is also capable of easy manipulation.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a plan view of the basket comprising the most essential portion of my dipper. Fig. 2 is a plan view of the cover, which is used in connection with the basket. Fig. 3 is a longitudinal section of the basket, and Fig. 4 is a broken enlarged detail sectional view, showing the basket and cover placed in position for use.

The dipper comprises a basket 10 in which the cream drops are placed, and a cover 11 adapted to fit on the basket and prevent the displacement of the cream drops during the dipping process. The basket is provided with a frame 12 which is preferably rectangular, and beneath the sides of the frame are strengthening rails 13 which are bent upward at the top and are connected by the transverse rods 14, lying parallel with and beneath the ends of the frame 12 to which they are united by the coils or eyes 15, the wire of which is bent upward to form handles or bails 16 at the ends of the basket, and downward, as shown at 17, parallel with the rails 13, the ends of the depending parts 17 being bent at right angles to form the feet 18 on which the basket stands. The parts 17 and 13 are united by suitable clips 19 but may be united in any other convenient way.

The above described construction of the frame and support and handles is cheap and enables the basket frame to be made of wire, but I do not confine my invention to the construction of the frame described, as it is obvious that the frame may be made in many other ways and still serve its purpose of supporting the cream drop cups described below.

Extending across the frame 12, at necessary intervals, are cross bars 20 which serve to support the cream or drip cups or pockets 21, these cups being arranged over the entire top surface of the basket, and they are formed of cross wires bent to the required shape, as shown best in Fig. 4, the wires being secured to the rails of the frame 12 and extending over the cross bars 20.

The cover comprises a frame 22 shaped like the frame 12, and is provided at the ends with bails or handles 23 adapted to lie even and parallel with the handles 16 of the basket 10, and a network 24 covers the frame 22 so that when the cover is placed on the basket the cream cups 21 are all covered, so that the cream drops cannot jump out.

In using the dipper, the cream drops are placed in the cups 21, the cover 11 is placed on the basket, the handles or bails 16 or 23 are grasped, and the device dipped into the chocolate solution and removed, and this permits a sufficient quantity of the solution to adhere to the cream drops, which may be removed when convenient.

Having thus described my invention, I claim as new and desire to secure by Letters Patent—

1. A dipper for coating confections comprising a basket or tray provided with drip cups or pockets and a cover for the basket or tray.

2. A chocolate dipper, comprising a basket having a series of open sided cream cups therein, and a cover for the basket, substantially as described.

3. A chocolate dipper, comprising a basket having end bails and a series of cream cups thereon, and a cover for the basket, also having end bails, substantially as described.

4. A chocolate dipper comprising an open frame, a series of parallel wires crossing the frame, and secured at their ends thereto, and a series of cups formed of a series of serpentine or zig-zag wires crossing the frame and resting at their upward bends upon said cross wires, and the second series of serpentine or zig-zag wires at right angles to the first series and having their downward bends crossing the downward bends of the said first series substantially as described.

5. A chocolate dipper comprising the open wire frame 12, the strengthening rails 13 beneath the ends of the frame, bent upwardly at the top and connected by the transverse wires 14, said wires lying parallel with the ends of the frame 12 and united thereto by the integral coils 15, handles 16 formed by extension of the said wires beyond the coils, the said wires extending thence along the rails 13 as shown at 17 and terminating in feet 18, clips 19 uniting the parts 13, 17 and a series of cups formed of crossed serpentine or zig-zag wires secured at their ends to the sides and ends of the frame respectively, substantially as described.

CYPRIEN GOUSSET.

Witnesses:
WILLIAM REGAN,
CHARLES H. DARROW, Jr.